1

3,449,114
HERBICIDAL METHOD EMPLOYING
N-ALLYLDIPHENYLACETAMIDE
Albert Pohland, Indianapolis, Ind., assignor to Eli Lilly and Company, Indianapolis, Ind., a corporation of Indiana
No Drawing. Original application Sept. 9, 1960, Ser. No. 54,851, now Patent No. 3,120,434, dated Feb. 4, 1964. Divided and this application Oct. 29, 1963, Ser. No. 319,681
Int. Cl. A01n 21/02, 9/20
U.S. Cl. 71—118   7 Claims This application is a division of my copending application Ser. No. 54,851, filed Sept. 9, 1960, now U.S. Patent No. 3,120,434.

This invention relates to novel herbicidal compositions having broad though selective herbicidal activity and to herbicidal processes employing these compositions. More particularly, this invention relates to novel herbicidal processes employing compositions in which an N-allyl-N-aliphatic-substituted diphenylacetamide is the herbicidally active ingredient.

In the past, two types of broad spectrum herbicides have been available. One of these comprises 2,4-dichlorophenoxyacetic acid and related compounds which are useful for killing dicotyledonous plants. The monocotyledonous plants, which include the grasses, are not greatly affected by this type of herbicide, but only by nonselective herbicides such as sodium arsenite, p-chlorophenyldimethyl urea, sodium chlorate, and ammonium sulfamate, all of which effectively destroy all types of vegetation. Only a few compounds have been found which will destroy monocotyledonous plants such as grasses, preferentially to dicotyldonous plants, and still fewer compounds have been found which will destroy grasses and only certain classes of broad-leaf plants.

It is an object of this invention to provide compositions which are toxic both to grasses in either their germinating or mature stages and to broad-leaf weeds, but which are nontoxic for broad-leaf crop plants. It is a further object of this invention to provide novel compositions and processes which can eliminate both weed grasses and broad-leaf weeds selectively from crop plants such as tomatoes, potatoes, cabbage, tobacco, strawberries, and their close relatives in the plant kingdom.

In fulfillment of the above and other objects, this invention provides a novel process and compositions for inhibiting the growth of weed grasses and broad-leaf weeds. The novel process comprises applying to an area infested with weed seeds, seedlings and mature weed plants a herbicidal amount of a compound represented by the following formula:

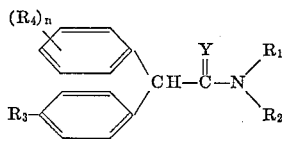

wherein $R_1$ is allyl; $R_2$ is methyl, ethyl, n-propyl, isopropyl or allyl; $R_3$ is hydrogen or chlorine; $R_4$ is methyl or halogen; $n$ is 0, 1, or 2; and Y is oxygen or sulfur.

Illustrative compounds coming within the scope of this invention include N,Ndiallyl-(4-tolyl)-4-chlorophenylacetamide and N-allyl-N-n-propyl diphenylacetamide. As will be obvious to those skilled in the art, other equivalent aromatic and chlorinated aromatic groups can be substituted for the benzene rings, such being thienyl or chlorothienyl groups.

Compounds represented by the above formula are provided for use as pre-emergent selective herbicides in customary manner, such as sprays (preferably concentrates),

2 spreadable granules, or wettable powders. The compounds are insoluble in water, and hence for the preparation of emulsion-type sprays or wettable powders, they should be formulated with a wetting agent or surfactant to obtain a useful dispersion.

The novel processes of this invention comprise treating a soil area or locus infested with seeds, seedlings and/or mature weed grass plants, and broad-leaf weeds with a formulation containing a compound within the scope of the above formula as the herbicidally active ingredient. Illustratively, crop areas which can be treated with the herbicidal compositions of this invention for the elimination of weed grasses and broad-leaf weeds include those areas in which members of the following plant families are growing: Solanaceae, Compositae, Cruciferae and Rosaceae. Such crop areas include tomato fields, potato fields, tobacco fields, rose gardens, sunflower fields, strawberry patches, and truck gardens where cabbage, peppers, radishes, cauliflower, and the like plants are being grown. Other areas from which weed grasses and broad-leaf weeds can be eliminated include gravel driveways or walks, road shoulders, and the like.

Compositions containing the herbicidally active compound are conveniently distributed by spray or by other suitable spreader to the area to be treated, preferably at a rate of about ½ to about 16 lb. of active ingredient per acre. When a spray is used as the medium of distribution, the herbicidal compositions are preferably applied at a rate of about 1 to 4 lb. of active ingredient per acre. However, if the herbicidal compositions are applied to the particular area in a granular form which the active herbicide is slowly released so that there is a more prolonged herbicidal action, a greater amount of active material per acre is generally employed than when a spray is used, this greater amount being in the range of 2 to 8 lb. per acre of active ingredient.

Seedlings, germinating seeds, and mature plants of many varieties of grasses are killed by the above treatment process, such including both undesirable grasses such as the crabgrasses (*Digitaria sanguinalis* and *Digitaria ischaemum*); green and yellow foxtails (*Setaria viridis* and *Setaria lutescens*); Johnson grass (*Sorghum halepense*); goose grass (*Eleusine indica*); sandbur (*Cenchrus pauciflorus*); witch grass (*Panicum capillare*), and the like, as well as the desirable grasses such as Bermuda grass (*Cynodon dactylon*); Kentucky bluegrass (*Poa pratensis*); fescues (*Festuca sp.*); orchard grass (*Dactylis glomerata*); and red top (*Agrostis alba*).

The broad-leaf weeds which can be eliminated from infested areas by the processes and compositions of this invention include many of the most common and pestiferous weeds known, among which are included weeds belonging to the Amaranthaceae such as pigweed, Polygonaceae such as smartweed, Chenopodiaceae such as lamb's quarters, Portulacaceae such as purslane, and Malvaceae such as velvet leaf.

As might be expected, broad-leaf weeds are unaffected by the herbicidal action of the compositions of this invention to the extent that such weeds belong to the families Solanaceae, Compositae, Cruciferae, and Rosaceae, enumerated above.

The herbicidal compositions of this invention do not affect the growth of crop plants other than the members of the four families of broad-leaf plants set forth above. For example, corn, cotton, alfalfa, flax, sorghum and soybean seedlings are not affected by the application of a compound represented by the above formula in an amount sufficient to destroy germinating grasses. Mature cotton and sorghum plants are also unaffected by application of an amount of one of the compositions of this invention sufficient to eradicate weed grasses and broadleaf weeds from the crop-growing area.

The following examples more clearly illustrate the invention. It is to be understood, however, that such examples are illustrative only, and are not intended as limitations upon the scope of the invention.

Example 1

The following experimental procedure was used to demonstrate the efficacy of the compositions of this invention in killing germinating and seedling grasses without affecting the germination of seeds and the growth of seedlings of selected broad-leaf plants; A soil was prepared consisting of one part masonry sand and one part shredded top soil blended together in a cement mixer. One gallon of this soil was placed in a 25 x 35 cm. galvanized flat and was patted down with a bench brush until level. A three-row marker was used to make 2½ cm. deep furrows in approximately two-fifths of the flat. Crop seeds consisting of four kernels of corn, five cotton seeds and five soybean seeds were placed in these furrows. A four-row template was then placed on the remaining soil and the indicated amounts of each of the following seeds were planted, one species to each section: foxtail (millet), 100 mg.; broad-leaf mustard, 50–75 mg.; rough pigweed, 30–50 mg.; and large crabgrass, 350–400 mg. Sufficient soil was added to cover the entire flat. Thus, the weed seeds were covered to a depth of about 6 mm. and the crop plant seeds were covered to a depth of about 3 cm.

In assaying the effect of the compositions as pre-emergent herbicides, a flat prepared as above, taken either on the day of planting or on the next day, was placed in a chamber equipped with a turntable and an air exhaust. The herbicidal composition, whether it was a spray-type emulsion or a wettable powder, was applied to the flat with a modified DeVilbiss atomizer hooked to an air source. Twelve and one-half ml. of the composition under test were applied to each flat either on the day of planting or the succeeding day. For measuring the efficacy of the herbicidal compositions as post-emergent herbicides, the same experimental setup was used except that the flats were sprayed after nine to twelve days in a greenhouse, the length of growing time depending upon the season and light intensity. Injury ratings and observations as to type of injury were made in either case eleven to twelve days after treatment. The injury rating scale used was as follows:

0 _____ No injury.
1 _____ Slight injury.
2 _____ Moderate injury.
3 _____ Severe injury.
4 _____ Death.

When more than one determination was carried out, an average value was calculated for the injury rating.

Tables I and II set forth the results of testing N-allyl-N-aliphatic-substituted diphenyl acetamides within the scope of the above formula as pre-emergent and post-emergent herbicides. In each table, column 1 gives the name of the compound under test; column 2, the rate in pounds per acre at which the compound is applied to the test flat; and the remaining columns, the injury to the particular plant seeds or seedlings as measured by the foregoing scale.

TABLE I.—INJURY RATING ON PRE-EMERGENT TREATMENT

| Compound | Lbs./Acre | Corn | Cotton | Soybean | Crabgrass | Mustard | Pigweed | Foxtail Millet |
|---|---|---|---|---|---|---|---|---|
| N,N-diallyl diphenylacetamide | 8 | 1 | 0 | 0 | 4 | 1 | 3 | 4 |
|  | 4 | 0 | 0 | 0 | 4 | 0 | 2 | 3 |
|  | 2 | 0 | 1 | 0 | 3 | 0 | 1 | 2 |
|  | 1 | 0 | 0 | 0 | 2 | 0 | 0 | 1 |
| N-allyl-N-methyl diphenylacetamide | 8 | 0 | 0 | 0 | 4 | 2 | 3 | 4 |
|  | 4 | 0 | 0 | 0 | 3 | 1 | 2 | 4 |
|  | 2 | 0 | 0 | 0 | 3 | 0 | 2 | 3 |
|  | 1 | 0 | 0 | 0 | 2 | 0 | 1 | 1 |
| N-allyl-N-ethyl diphenylacetamide | 8 | 0 | 0 | 0 | 4 | 1 | 2 | 4 |
|  | 4 | 0 | 0 | 0 | 3 | 1 | 2 | 4 |
|  | 2 | 0 | 0 | 0 | 3 | 0 | 1 | 3 |
|  | 1 | 0 | 0 | 0 | 0 | 0 | 1 | 1 |

TABLE II.—INJURY RATING ON POST-EMERGENT TREATMENT

| Compound | Lbs./Acre | Corn | Cotton | Soybean | Crabgrass | Mustard | Pigweed | Foxtail Millet |
|---|---|---|---|---|---|---|---|---|
| N,N-diallyl diphenylacetamide | 8 | 1 | 0 | 2 | 3 | 3 | 3 | 2 |
|  | 4 | 1 | 0 | 1 | 2 | 2 | 3 | 1 |
|  | 2 | 0 | 0 | 1 | 1 | 1 | 1 | 1 |
| N-allyl-N-methyl diphenylacetamide | 8 | 2 | 1 | 3 | 2 | 3 | 1 | 2 |
|  | 4 | 1 | 0 | 2 | 2 | 2 | 1 | 2 |
|  | 2 | 1 | 0 | 1 | 2 | 1 | 1 | 1 |
|  | 1 | 1 | 0 | 1 | 1 | 1 | 0 | 1 |
| N-allyl-N-ethyl diphenylacetamide | 8 | 0 | 1 | 2 | 3 | 2 | 2 | 2 |
|  | 4 | 0 | 0 | 1 | 2 | 2 | 2 | 1 |
|  | 2 | 0 | 0 | 1 | 0 | 1 | 0 | 0 |
|  | 1 | 0 | 0 | 0 | 0 | 0 | 0 | 0 |

In the above trials, the compound under test was formulated as a spray by one of the following procedures. In one method the particular compound was wetted by grinding in a mortar with one part of polyoxyethylene sorbitan monolaurate. Five hundred parts of water were added slowly to the resultant creamy paste to give an aqueous dispersion with a surfactant concentration of 0.2 percent. This dispersion was entirely satisfactory for spray application. In a second procedure the compound was dissolved in one volume of acetone, and the acetone solution was diluted with nineteen volumes of water containing 0.1 percent of polyoxyethylene sorbitan monolaurate.

Example 2

Further testing of N,N-diallyldiphenylacetamide was carried out against a broader spectrum of plants than was included within the preliminary test. Among these plants were broad-leaf, ornamental and crop plants, and certain crop grasses. The compound was tested on the plants against both the pre-emergent and post-emergent growth stages.

In the pre-emergent test the seeds were sown in flats, as described in Example 1, and were treated with the formulated compound the following day. Observations as to injury rating were made in most cases fourteen days after treatment. However, since three weeks' time is required for certain slow-growing species, observations were made up to twenty-one days after treatment.

In the post-emergent extended test the various species of plants were seeded in three-inch square wood bands with bottoms. Soil was placed in the band and pressed down to an even depth. Small seeds were planted by covering them with up to 6 mm. of soil, whereas large seeds, such as beans, corn, cotton, sorghum, and the like, were planted 12 mm. or more below the surface of the soil. The planted boxes were placed in a greenhouse, and by judiciously regulating the planting time, plants of different types were readied for treatment at the same time deposite the wide differences (seven to twenty-one days) in the time required for seeds of the various plants to germinate and for seedlings to grow to a suitable size. Flats containing one box of each of the species under test were assembled and were sprayed with the test material by the procedure described in Example 1.

Table III sets forth the results of the tests. In this table, the same injury ratings are used as were used in Tables I and II. The figures at the top of the vertical columns give the application rate in pounds per acre.

TABLE III.—INJURY RATING ON TREATMENT OF ASSORTED BROAD-LEAF PLANTS AND GRASSES

| Plant | Variety | Pre-emergent, N,N-diallyl diphenylaceta-mide | | | | Post-emergent, N,N-diallyl diphenylaceta-mide | | | |
|---|---|---|---|---|---|---|---|---|---|
| | | 1 | 2 | 4 | 8 | 1 | 2 | 4 | 8 |
| Alfalfa | Ranger | 0 | 0 | 1 | 1 | 0 | 1 | 1 | 2 |
| Clover | Red | 1 | 2 | 2 | 3 | 0 | 1 | 2 | 2 |
| Flax | | 0 | 0 | 0 | 0 | 0 | 1 | 1 | 1 |
| Nut grass | Yellow | 0 | 0 | 0 | 1 | 0 | 0 | 0 | 1 |
| Ragweed | Common | 0 | 0 | 1 | 0 | 0 | 0 | 1 | 1 |
| Smartweed | Pennsylvania | 0 | 0 | 1 | 2 | 0 | 1 | 1 | 1 |
| Sorghum | Amak R-10 | 0 | 0 | 1 | 2 | 0 | 0 | 0 | 0 |
| Tomatoes | Rutgers | 0 | 0 | 1 | 1 | 0 | 0 | 0 | 1 |
| Wheat | Vermillion | 0 | 0 | 1 | 2 | 1 | 1 | 2 | 2 |
| Wild Oats | | 0 | 0 | 1 | 2 | 0 | 1 | 1 | 1 |

Example 3

The compounds of the present invention can be formulated to yield the herbicidal compositions of my invention in accordance with the following procedure, described with reference to N,N-dimethyl diphenylacetamide, it being understood that the ratio of dispersants and wetting agents may be required to be varied, depending upon the physical properties of the particular compound.

(1) Granular formulation.—500 g. of N,N-dimenthyl diphenylacetamide were slurried with 2.2 kg. of phenyl Cellosolve, and the resulting mix was warmed to approximately 40° C. with slight agitation until there were no visible solids present. The solution was then sprayed at the elevated temperature, under a pressure of about 5–8 p.s.i., upon 7.3 kg. of 30/60 mesh calcined attapulgite clay. The granules were tumbled throughout the impregnation to achieve homogeneity, and tumbling was continued until a homogenous, dry flowable product was obtained. The resulting product contained 5 percent by weight of N,N-dimenthyl diphenylacetamide, 22 percent solvent, and 73 percent clay granules.

(2) Wettable powder.—One pound of N,N-dimethyl diphenylacetamide was thoroughly dry-blended with 136.2 g. of a finely-divided synthetic hydrated silica, 32.4 g. of sodium lignosulfonate, and 25.9 g. of sodium N-methyl-N-oleoyl taurate. This mix was then passed once through a hammer mill to yield a powder with maximum particle size of approximately 100 mesh. The final composition contained 70 percent N,N-dimethyl diphenylacetamide, 21 percent synthetic hydrated silica, 5 percent dispersant, and 4 percent wetting agent.

(3) Emulsifiable concentrate.—An emulsifiable concentrate containing 1.25 lb. per gal. was prepared by dissolving 13 g. of N,N-dimethyl diphenylacetamide in a two-component solvent containing three parts xylene to two parts phenyl Cellosolve. A complex blend of alkylarylsulfonate and non-ionic emulsifiers was added to this solution as the emulsifying agent. The final composition of this liquid concentrate was, by weight, 15.3 percent N,N-dimethyl diphenylacetamide, 41.3 percent xylene, 35.4 percent phenyl Cellosolve, and 8.0 percent emulsifier.

The compounds of this invention are relatively non-toxic for mammals; for example, the median lethal oral dose of N,N-dimethyl diphenylacetamide for mice was about 700 mg./kg., and the median lethal dises intraperitoneally or subcutaneously were approximately 800 to 1,000 mg./kg.

The compounds which are the herbicidally active ingredients in my novel compositions and processes are prepared, as illustrated in the following paragraphs, by reacting diphenylacetyl chloride or a suitably substituted diphenylacetyl chloride with a secondary amine in the presence of a base. The base is preferably employed in at least equimolar ratio to the diphenylacetyl chloride in order to take up the liberated hydrogen chloride. For this purpose, the base may be merely an additional quantity of the secondary amine. The diphenylacetyl chlorides are prepared by hydrolyzing the corresponding diphenylacetonitrile, prepared by the method of Jack Mills described in U.S. Patent No. 2,447,419, and subsequently reacting the hydrolytically produced acid with thionyl chloride.

The following is an illustration of the Mills procedure and subsequent hydrolysis:

53 g. of benzaldehyde are mixed with 72 g. of fluorobenzene and 25 ml. of hydrogen cyanide. The reaction mixture is cooled to about 0° C., is saturated with boron trifluoride, and is stirred for about 16 hours at ambient room temperature. It is then washed twice with 100-ml. portions of water, twice with 100-ml. portions of aqueous sodium bisulfite solution, and again twice with 100-ml. portions of water. The organic layer is separated and dried, and the volatile substituents are evaporated in vacuo. Distillation of the residue yields (4-fluorophenyl) phenylacetonitrile, which boils at about 109° C. at a pressure of about 0.05 mm. of mercury. It melts at about 39–41° C. and has an index of refraction, $n_D^{25}=1.560$.

10.5 g. of the (4-fluorophenyl) phenylacetonitrile are heated at refluxing temperature with 35 g. of potassium hydroxide dissolved in 250 ml. of a 1:1 ethanol-water mixture. The reaction mixture is cooled and is extracted with 250 ml. of ether to remove any unreacted starting material and any (4-fluorophenyl) phenylacetamide also formed in the reaction. The reaction mixture is acidified with 12 N hydrochloric acid, and the (4-fluorophenyl)-phenylacetic acid, which is insoluble in the acid, precipitates. The precipitate is collected by filtration. (4-fluorophenyl) phenylacetic acid thus prepared melts at about 106–107° C. after recrystallization from aqueous ethanol.

The following procedure, described with reference to N.N-dimethyl diphenylacetamide, was employed for the preparation of several compounds of the invention by diphenylacetyl chloride and the appropriate secondary amine. Pertinent data are given in Table IV.

TABLE IV.—MISCELLANEOUS DIPHENYLACETAMIDES

| Product | Amine | Product M.P., °C. | Analysis, N | |
|---|---|---|---|---|
| | | | Calc. | Found |
| N,N-diallyl diphenylacetamide | Diallylamine | <R.T. | 4.80 | 4.34 |
| N-allyl-N-ethyl diphenylacetamide | Allylethylamine | 50–52 | 5.01 | 4.92 |
| N-allyl-N-methyl diphenylacetamide | Allylmethylamine | [1] 53–57 | 5.28 | 5.38 |

[1] Purified by distillation.

9.66 g. of diphenylacetyl chloride were dissolved in 25 ml. of benzene. A solution of 5.68 g. of dimethylamine in 50 ml. of benzene was added dropwise to the acid chloride solution. After the addition had been completed, the reaction mixture was heated at refluxing temperature for an additional 2½ hours. The reaction mixture was cooled, and sufficient chloroform was added to render the mixture homogeneous. The organic layer was washed with successive 100-ml. portions of 10 percent hydrochloric acid, water, saturated sodium bicarbonate solution and water, and was then dried. The solvents were removed by evaporation in vacuo, and the residue, comprising N,N-dimethyl diphenylacetamide formed in the above reaction, was recrystallized three times from a mixture of benzene and hexane and twice from a mixture of ethyl acetate and hexane. N,N-dimethyl diphenylacetamide thus prepared melted at about 128° C.

I claim:
1. The method of preventing germination of seeds and controlling growth of plants which comprises contacting said seeds and plants with a hermicidally effective amount of N,N-diallyl diphenylacetamide.
2. A method for inhibiting the growth of plants of the class of weed grasses and broad-leaf weeds, said plants being in any stage of development from seeds to mature plants, which comprises applying to an area containing plants of said class a herbicidal amount of a compound represented by the following formula:

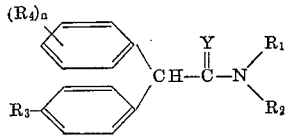

wherein $R_1$ is allyl; $R_2$ is a member of the group consisting of methyl, ethyl, n-propyl, isopropyl, and allyl; $R_3$ is a member of the group consisting of hydrogen and chlorine; $R_4$ is a member of the group consisting of methyl and halogen; $n$ is selected from the group consisting of 0, 1, and 2; and Y is oxygen.
3. A method for inhibiting the growth of weed grasses and broad-leaf weeds which comprises applying to an area infested with weed seeds and weed plants a herbicidal amount of a composition containing an inert diluent and as a herbicidally active ingredient a compound represented by the formula:

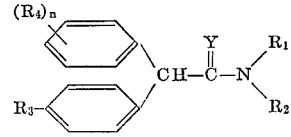

wherein $R_1$ is allyl; $R_2$ is a member of the group consisting of methyl, ethyl, n-propyl, isopropyl, and allyl; $R_3$ is a member of the group consisting of hydrogen and chlorine; $R_4$ is a member of the group consisting of methyl and halogen; $n$ is selected from the group consisting of 0, 1, and 2; and Y is oxygen.
4. A method for inhibiting the growth of weed grasses and broad-leaf weeds which comprises applying to an area infested with weed seeds and weed plants an amount of about ½ to about 16 lb. per acre of a herbicidally active compound represented by the formula:

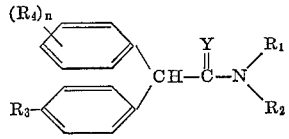

wherein $R_1$ is allyl; $R_2$ is a member of the group consisting of methyl, ethyl, n-propyl, isopropyl, and allyl; $R_3$ is a member of the group consisting of hydrogen and chlorine; $R_4$ is a member of the group consisting of methyl and halogen; $n$ is selected from the group consisting of 0, 1, and 2; and Y is oxygen.
5. The method of claim 4 wherein N,N-diallyl diphenylacetamide is the herbicidally active compound.
6. The method of claim 4 wherein N-allyl-N-methyl diphenylacetamide is the herbicidally active compound.
7. The method of claim 4 wherein N-allyl-N-ethyl diphenylacetamide is the herbicidally active compound.

References Cited

UNITED STATES PATENTS 3,043,676   7/1962   Lemin _____ 71—118
3,063,822   11/1962  Soper _____ 71—118

JAMES O. THOMAS, JR., *Primary Examiner.*